(12) United States Patent
Rutan

(10) Patent No.: US 8,727,264 B1
(45) Date of Patent: May 20, 2014

(54) DYNAMIC TOW MANEUVER ORBITAL LAUNCH TECHNIQUE

(71) Applicant: Elbert L. Rutan, Coeur D'Alene, ID (US)

(72) Inventor: Elbert L. Rutan, Coeur D'Alene, ID (US)

( * ) Notice: Subject to any disclaimer, the term of this patent is extended or adjusted under 35 U.S.C. 154(b) by 0 days.

(21) Appl. No.: 13/914,744

(22) Filed: Jun. 11, 2013

(51) Int. Cl.
*B64D 3/00* (2006.01)
*B64C 31/02* (2006.01)
*B64G 1/00* (2006.01)

(52) U.S. Cl.
USPC ....... 244/2; 244/158.1; 244/171.1; 244/171.3

(58) Field of Classification Search
USPC ........... 244/2, 63, 171.1, 171.3, 171.4, 158.9, 244/158.1, 159.3, 171
See application file for complete search history.

(56) References Cited

U.S. PATENT DOCUMENTS

| | | | |
|---|---|---|---|
| 4,043,524 A | 8/1977 | Dreyer et al. | |
| 4,614,320 A | 9/1986 | Rutan | |
| 4,641,800 A | 2/1987 | Rutan | |
| D292,393 S | 10/1987 | Rutan | |
| 4,802,639 A * | 2/1989 | Hardy et al. | 244/2 |
| 5,395,073 A | 3/1995 | Rutan et al. | |
| 5,564,648 A * | 10/1996 | Palmer | 244/2 |
| 5,626,310 A * | 5/1997 | Kelly | 244/2 |
| 5,769,359 A | 6/1998 | Rutan et al. | |
| 5,975,464 A * | 11/1999 | Rutan | 244/120 |
| 6,029,928 A * | 2/2000 | Kelly | 244/2 |
| 6,089,504 A | 7/2000 | Williams et al. | |
| 6,276,866 B1 | 8/2001 | Rutan | |
| 6,913,224 B2 * | 7/2005 | Johansen | 244/3 |
| 7,195,207 B2 | 3/2007 | Rutan | |
| 7,252,270 B2 * | 8/2007 | Mitzmacher | 244/171.3 |
| 7,523,892 B2 | 4/2009 | Cook | |
| 7,540,145 B2 | 6/2009 | Rutan | |
| 8,262,015 B2 * | 9/2012 | Kuroda et al. | 244/3 |
| 8,308,142 B1 | 11/2012 | Olson | |

FOREIGN PATENT DOCUMENTS

| | | |
|---|---|---|
| EP | 0680436 B1 | 11/1998 |
| EP | 0793599 A4 | 4/1999 |
| EP | 1608555 B1 | 3/2008 |
| EP | 1608863 B1 | 6/2012 |
| EP | 2279945 A3 | 1/2013 |

* cited by examiner

*Primary Examiner* — Tien Dinh
*Assistant Examiner* — Michael Wang
(74) *Attorney, Agent, or Firm* — Mitch Harris, Atty at Law, LLC; Andrew M. Harris

(57) ABSTRACT

An orbital launch system and its method of operation use a maneuver to improve the launch condition of a booster rocket and payload. A towed launch aircraft, to which the booster rocket is mounted, is towed to a predetermined elevation and airspeed. The towed launch aircraft begins the maneuver by increasing its lift, thereby increasing the flight path angle, which increases the tension on the towline connecting the towed launch aircraft to a towing aircraft. The increased tension accelerates the towed launch aircraft and booster rocket, while decreasing the speed (and thus the kinetic energy) of the towing aircraft, while increasing kinetic energy of the towed launch aircraft and booster rocket by transferring energy from the towing aircraft. The potential energy of the towed launch aircraft and booster rocket is also increased, due to the increased lift. The booster rocket is released and ignited, completing the launch.

24 Claims, 20 Drawing Sheets

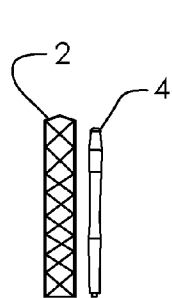
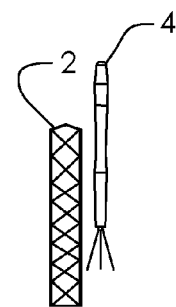
Fig. 1A
(Prior Art)
Fig. 1B
(Prior Art)
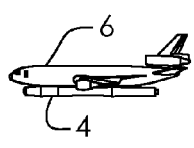
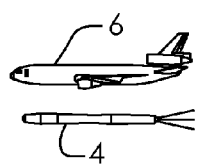
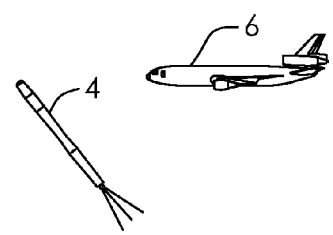
Fig. 2A
(Prior Art)
Fig. 2B
(Prior Art)
Fig. 2C
(Prior Art)

US 8,727,264 B1

DYNAMIC TOW MANEUVER ORBITAL LAUNCH TECHNIQUE

This invention was made with government support under NND12AB91Z awarded by the National Aeronautics and Space Administration (NASA) Dryden Flight Research Center. The government has certain rights to this invention.

BACKGROUND OF THE INVENTION

1. Field of the Invention

The present invention relates generally to towed-booster orbital launch systems, and more particularly to an orbital launch technique that transfers kinetic energy from the tow aircraft to a towed launch aircraft and booster using a maneuver.

2. Description of the Related Art

Launch of a payload, such as a spacecraft or satellite, into orbit has traditionally been performed by accelerating the spacecraft from the ground to a required elevation using booster rockets that contain enough thrust to lift the spacecraft. Since the energy required to continue lifting the spacecraft and the booster rocket decreases as the fuel is expended and as air resistance decreases, the boosters are frequently staged and have a fuel supply much larger for earlier stages than for subsequent stages. Further, the vertical launch structure required for such launches is costly and constrains the initial location of the launch to particular launch sites. FIGS. 1A-1B illustrate such a prior art vertical ground-based rocket launch, with a launch tower 2 supporting booster rocket 4 (and attached payload), until the ignition of booster rocket 4 as shown in FIG. 1B.

In order to remove launch constraints and to attempt to reduce the size and cost of booster rockets used in ground-based launches, aircraft have been used to carry the booster rocket and attached payload to elevations near typical aircraft ceilings before the booster rocket is ignited. FIGS. 2A-2C illustrate such a prior art launch technique, in which booster rocket 4 is released from the underside of a launch aircraft 6. Booster rocket 4 is ignited after release, and gains the benefit of added launch elevation, e.g., 30,000-40,000 feet, and an initial horizontal velocity supplied by the launch aircraft, i.e., 600 mph. Typically, the gains of air launch are greatly reduced over theoretical gains, because the booster rocket must be reinforced to provide for horizontal carrying of the booster rocket. The booster rocket also typically requires a wing in order to make the turn needed to increase the pitch angle of booster rocket 4 as shown in the transition to that of FIG. 2C from that of FIG. 2B, which aligns the flight path of booster rocket 10 to the required orbit.

More recently, techniques have been developed using a tow aircraft to tow a towed launch glider. Such techniques improve launch efficiency, i.e., the ratio of the mass of the payload that reaches orbit to the total pre-launch mass of the booster rocket with payload, by carrying the booster rocket to a greater launch elevation. Such techniques provide improvement because the lift provided by the glider is greater than the lift that can be provided by launch aircraft 6 in FIGS. 2A-2C. Such a technique is illustrated in FIGS. 3A-3C, in which aircraft 6 is used to tow a towed launch aircraft 8, under which booster rocket 4 is mounted. A tow line 9 couples aircraft 6 to towed launch aircraft 8 until the desired launch elevation is reached, at which time tow line 9 is released. Then, towed launch aircraft 8 pulls up slightly to orient booster rocket 4 above horizontal, as shown in FIG. 3B. Finally, booster rocket 4 is dropped and ignited as shown in FIG. 3C.

However, even with all of the improvements that have been made to date, launch of a payload into orbit is an extremely costly operation and an improvement in launch efficiency can significantly reduce the fuel and booster cost. Therefore, it would be desirable to provide a further improved towed launch of a booster and payload.

SUMMARY OF THE INVENTION

The above objectives and others are achieved in a method and system for launching a payload to an orbital distance above a body.

The method and system perform launch of a payload into orbit above a body, such as earth. The method is a launch procedure followed by the system, which acts to carry out the launch procedure. The system includes a booster rocket connected to the payload and mounted to a towed launch aircraft. The towed launch aircraft is coupled to a towing aircraft with a tow line. The towing aircraft tows the towed launch aircraft and the booster rocket to a predetermined elevation and then executes a maneuver that increases a lift of the towed launch aircraft to increase a flight path angle of the towed launch aircraft and substantially increase tension on the tow line. The increased tension on the tow line results in an acceleration of the towed launch aircraft along the towed launch aircraft's flight path, increasing the kinetic energy of the towed launch aircraft. The increased tension also results in a deceleration of the towing aircraft that decreases the towing aircraft's kinetic energy. The increased lift of the towed launch aircraft also raises the altitude, and thus the potential energy of the towed launch aircraft and booster rocket. The maneuver thus improves the launch condition of the booster rocket by increasing both the kinetic energy and the potential energy of the booster rocket.

The foregoing and other objectives, features, and advantages of the invention will be apparent from the following, more particular, description of the preferred embodiment of the invention, as illustrated in the accompanying drawings.

BRIEF DESCRIPTION OF THE DRAWINGS

The novel features believed characteristic of the invention are set forth in the appended claims. The invention itself, however, as well as a preferred mode of use, further objectives, and advantages thereof, will best be understood by reference to the following detailed description of an illustrative embodiment when read in conjunction with the accompanying drawings, wherein like reference numerals indicate like components, and:

FIGS. 1A-1B illustrate a prior art orbital launch technique.

FIGS. 2A-2C illustrate another prior art orbital launch technique.

DESCRIPTION OF ILLUSTRATIVE EMBODIMENT

The present invention encompasses methods and systems that improve a launch efficiency of orbital launches by using a towed launch configuration and extracting energy from the towing vehicle by increasing tension on the tow line for a short period just before the towed launch aircraft is released.

Figure 3A:
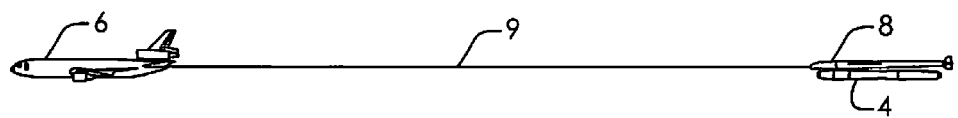
FIGS. 3A-3C illustrate still another prior art orbital launch technique.
Figure 3B:
Figure 3B:
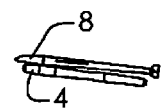
Figure 3C:
Figure 3C:
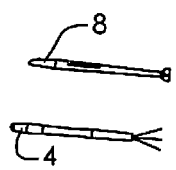
Figure 4A:
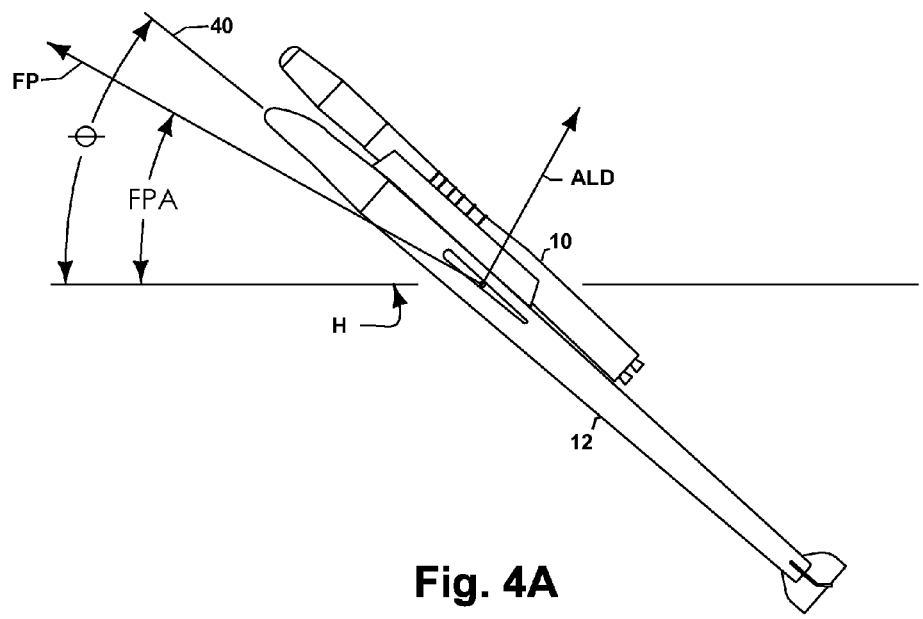
FIGS. 4A-4B are guides that illustrate definitions of angles used in the description.

FIG. 4A shows a booster rocket 10 mounted atop a towed launch aircraft 12 and are provided for definitions of the following angles/directions:

FP—flight path of a towed launch aircraft 12
FPA—flight path angle of towed launch aircraft 12
Φ—pitch angle of towed launch aircraft 12
H—horizontal (horizon direction)

Pitch angle Φ is the angle of a central longitudinal axis 40 of towed launch aircraft 12 above horizontal H and flight path angle FPA is the angle of flight path FP, i.e., the direction of travel of towed launch aircraft 12 above horizontal H.

Figure 4B:
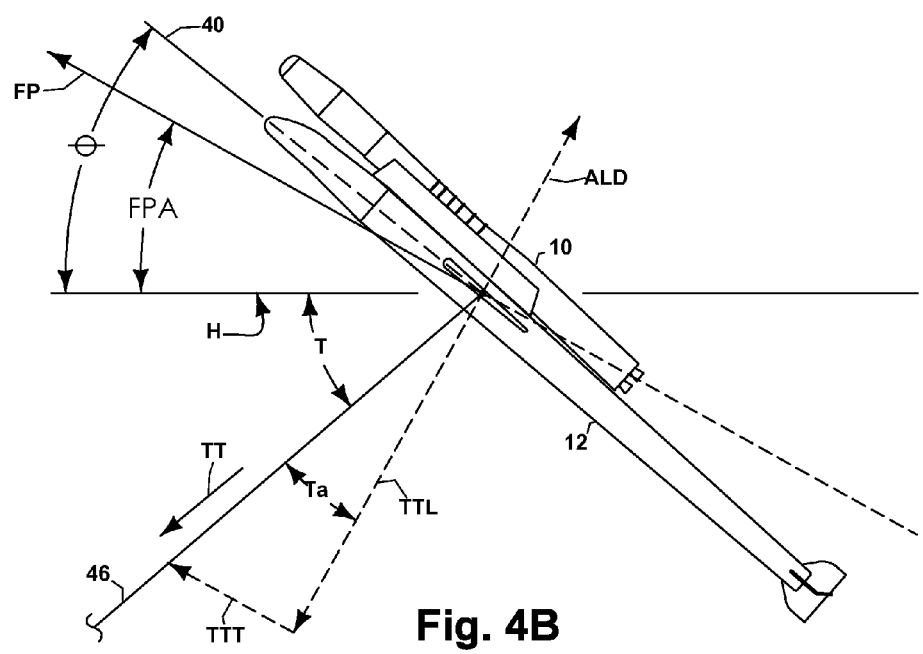

FIG. 4B shows the tow configuration of FIG. 4A, but with the addition of a tow line 46. Tow line angle T is the angle between the direction of tow line 46 and horizontal H. Angle Ta is the displacement angle between the direction of tow line 46 and the aircraft lift direction ALD. Aircraft lift direction ALD is perpendicular to flight path FP. Angle Ta causes tension TT on tow line 46 to provide thrust to towed launch aircraft 12 rather than countering the lift of towed launch aircraft 12, as would be the case if angle Ta were zero, i.e., if the direction of tow line 46 were directly along aircraft lift direction ALD. Tow line tension TT is shown broken down into two components: tension component TTT along flight path FP of towed launch aircraft 12, which is the component that provides thrust to towed launch aircraft 12 during the maneuver described herein, and tension component TTL, which is the component along aircraft lift direction ALD. Towed launch aircraft 12 is thus required to have increased lift to cancel tension component TTL.

Figure 5A:
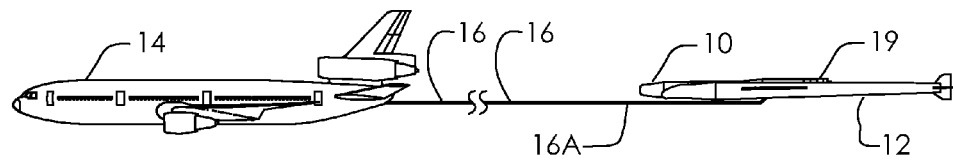
FIG. 5A is a side view and FIG. 5B is a top view of a towing arrangement in an exemplary orbital launch system.
Figure 5B:
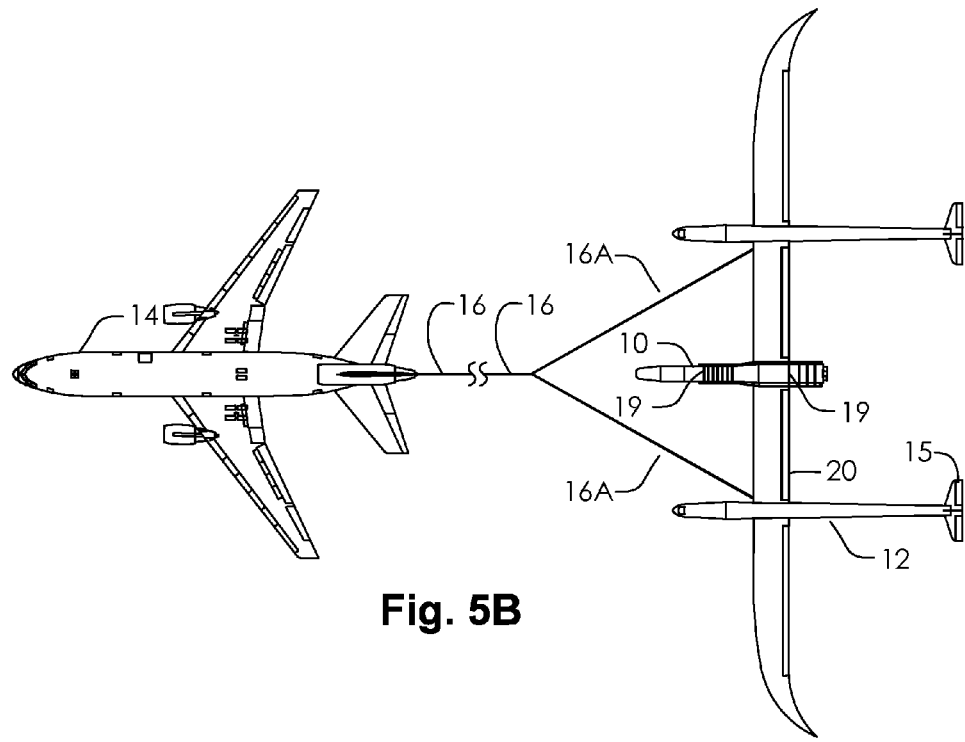

Referring now to FIGS. 5A-5B, a launch system is shown in side view and top view, respectively. A towing aircraft 14 is connected via a tow line, i.e. a tow line 16, to towed launch aircraft 12, atop which booster rocket 10 containing, or attached to a payload, is mounted. In the example, straps 19 are used to releasably secure booster rocket 10 atop a cradle of towed launch aircraft 12. Additional latches may also be used to secure booster rocket 10. Tow line 16 is approximately 25 times the length of towing aircraft 14 (e.g., 3500 feet for a 140 foot long towing aircraft 14), so in most of the Figures, tow line 16 is shown with a break for purposes of illustration. Tow line 16 is configured with split bridle sections 16A that eliminate interference with booster rocket 10 that otherwise might occur with a single cable connection. Bridle sections are generally attached to near the longitudinal center of gravity of towed launch aircraft 12 to prevent towed launch aircraft 12 from changing pitch under large tow line tensions. Towed launch aircraft 12 may be a glider, or may be a powered aircraft, which can simplify landing and subsequent re-use of towed launch aircraft 12. Towing aircraft 14, may for example be a DC-10 (DC-10 is a trademark of McDonnell Douglas Corporation) and tow line 16 may be a VECTRAN cable (VECTRAN is a trademark of Kuraray Co., Ltd. Corporation). The maneuver described below is generally initiated by manipulating elevators 15 of towed launch aircraft 12 to increase the lift, and thus the flight path angle FPA, of towed launch aircraft 12 for a predetermined period of time, until a particular flight path angle FPA is reached. Separation of towed launch aircraft 12 from booster rocket 10 is generally assisted by manipulating flaps 20 of towed launch aircraft to reverse the lift of, and thus to decrease flight path angle FPA of, towed launch aircraft 12 when booster rocket 10 has been released. However, alternative techniques to change the lift of towed launch aircraft 12 may be employed, depending on the particular design of towed launch aircraft 12. For example, if towed launch aircraft 12 employs a canard design, the maneuver described herein may be initiated by manipulating the canard elevators to increase the lift and flight path angle FPA of towed launch aircraft 12.

Figure 6:
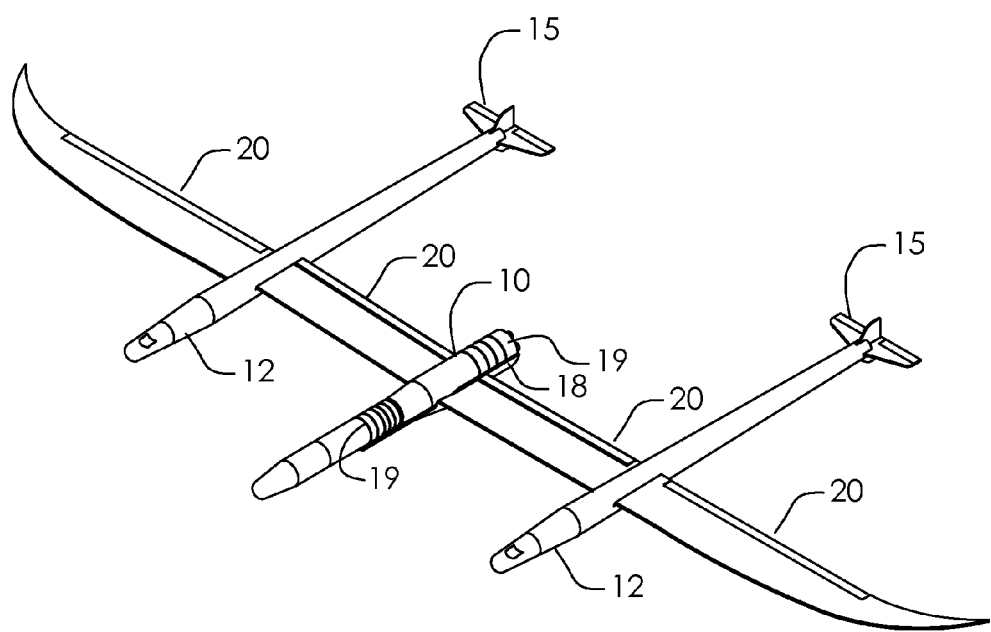
FIG. 6 is an isometric view of towed launch aircraft 12 of FIGS. 4A-4B with booster rocket 10 mounted in cradle 18.

Referring now to FIG. 6, further details of towed launch aircraft 12 are shown, including trailing edge flaps 20 that extend through almost the entire span of the wing of towed launch aircraft 12, which aids in reversing the lift of towed launch aircraft 12 to provide increased separation of booster rocket 10 in the subsequently-illustrated maneuvers. While the configurations shown in the Figures mount booster rocket 10 above the wing of towed launch aircraft 12, the maneuver illustrated in FIGS. 8A-8H below can alternatively be performed with an under-wing mounting configuration. As described above, booster rocket 10 is secured in a cradle 18 formed above the wing of towed launch aircraft 12 by multiple straps 19 that are releasable, to permit separation of booster rocket 10 from towed launch aircraft 12.

Figure 7:
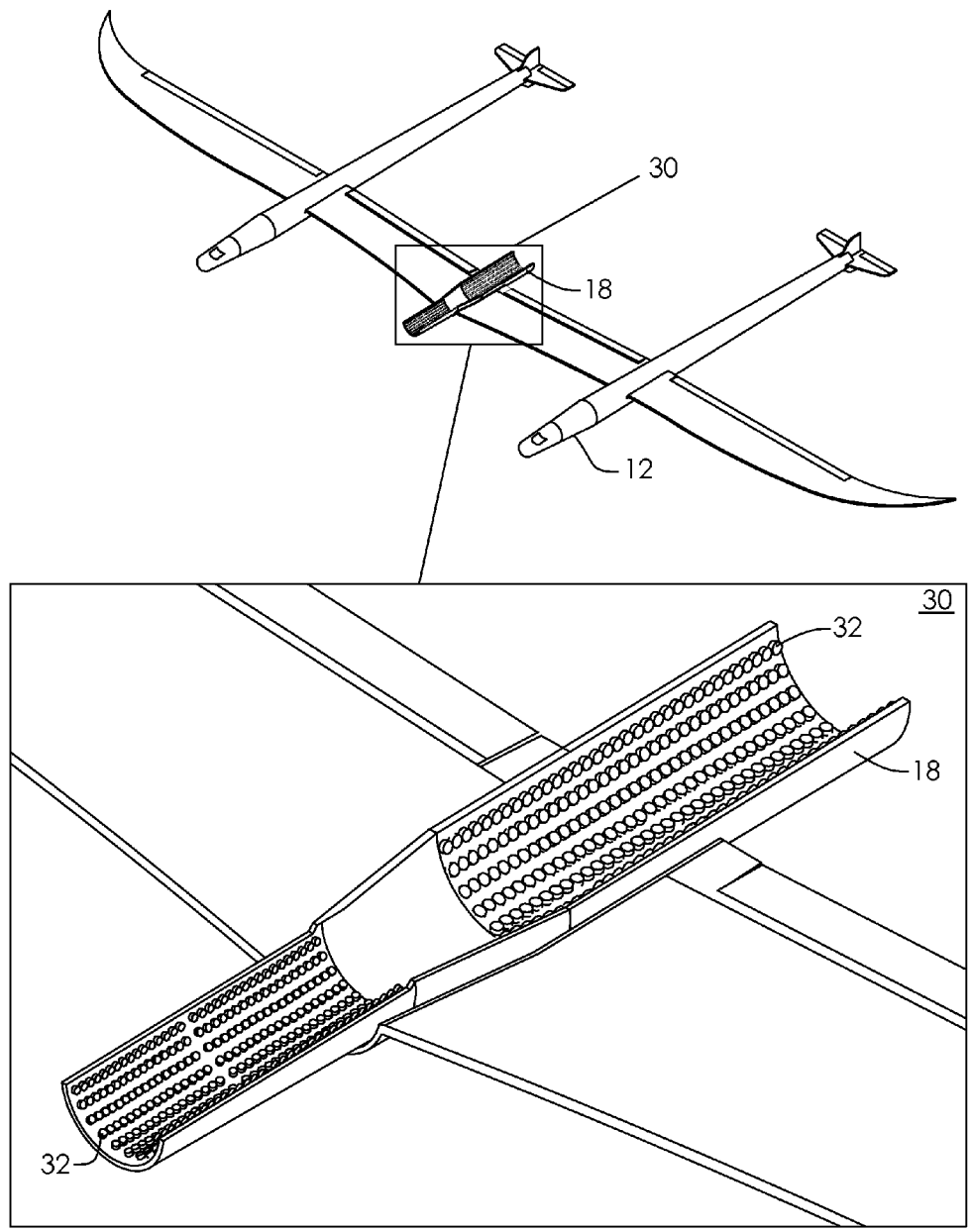
FIG. 7 is an isometric view of towed launch aircraft 12 of FIGS. 4A-4B showing details of cradle 18.

Referring now to FIG. 7, details of cradle 18 are shown. Within cradle 18, multiple balloons 32 are distributed to support booster rocket 10 and any attached payload, without causing substantial bending stress along the length of booster rocket 10 and eliminating large local loads on booster rocket 10 that would otherwise require additional reinforcement (and consequent increased weight) of booster rocket 10. A callout 30 shows further detail. Balloons 32 can be fabricated using a thickness of approximately 0.020 inch and can be fabricated using ordinary latex rubber. The diameter of balloons 32 in the example is 6 inches. Balloons 32 may be connected via manifolds to control and to equalize their internal pressure. Balloons 32 also aid in separation of booster rocket 10 when straps 19 are released. By providing balloons 32 rather than the typical discrete point supports employed by air launched vehicles, booster rocket 10 can be lighter and less costly, due to reduced structural requirements.

Figure 8A:
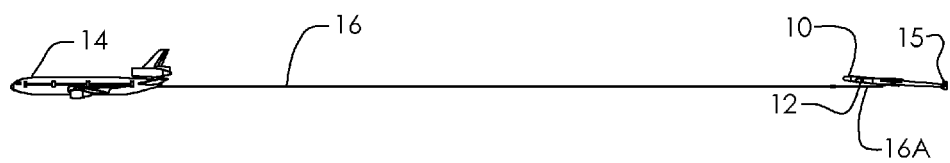
FIGS. 8A-8H are side views of the system of FIGS. 4A-4B illustrating a launch sequence of booster rocket 10.
Figure 8B:
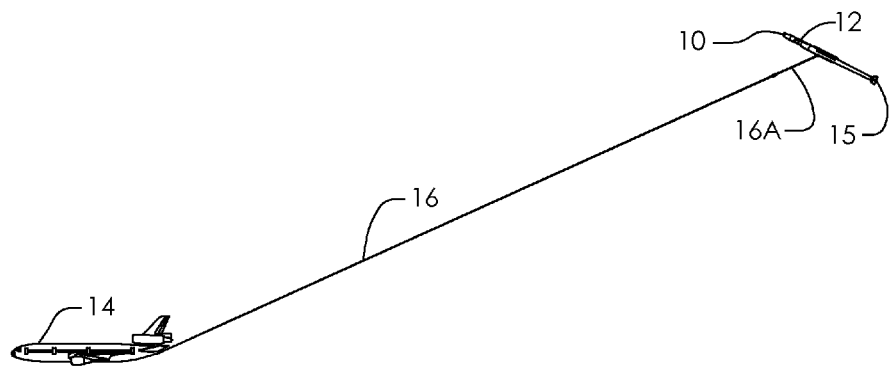
Figure 8C:
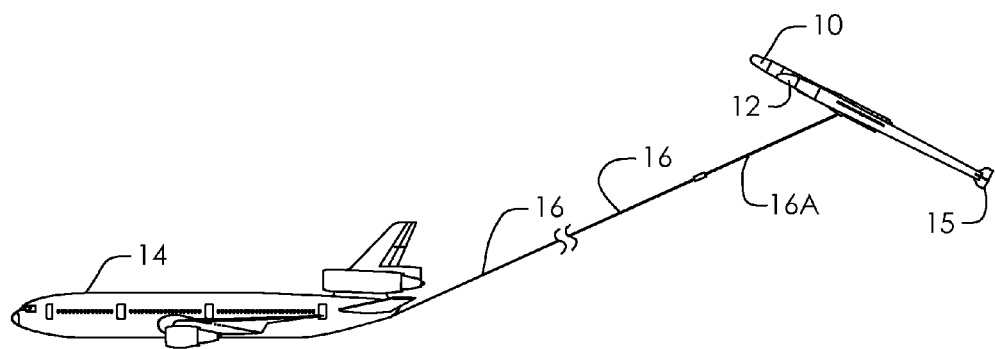

Referring now to FIGS. 8A-8H, a dynamic tow maneuver is shown that increases launch efficiency over a typical ground launch procedure by approximately 50%. In FIG. 8A the system formed by towing aircraft 14, towline 16, bridle sections 16A and towed launch aircraft 12/booster rocket 10 has reached a predetermined altitude, e.g., 30,000-40,000 feet, at which the dynamic tow maneuver is commenced by towed launch aircraft 12 raising elevators 15, increasing pitch angle Φ of towed launch aircraft 12, resulting in an approximately 60% increase in lift of towed launch aircraft 12. As illustrated in FIG. 8B-8C, the lift increase raises flight path angle FPA of towed launch aircraft 12 from zero to approximately 25 degrees above horizontal, within approximately 14 seconds. Because flight path angle FPA is increased, towed launch aircraft 12 rises above towing aircraft 14. As towed launch aircraft 12 pulls up, the tension on towline 16 increases dramatically. Before the pull-up maneuver, towline tension TT will be, for example, 7500 lb, which is equal to the drag of exemplary 125,000 lb towed launch aircraft 12/booster rocket 10 combination. After 14 seconds have elapsed, when flight path angle FPA reaches 25 degrees, towline tension TT, in the example, has increased to 130,000 lbs, i.e., more than the weight of towed launch aircraft 12/booster rocket 10 combination. The increased tension on towline 16 provides forward thrust to towed launch aircraft 12/booster rocket 10, by pulling forward on towed launch aircraft 12, simultaneously slowing towing aircraft 14 enough, in the example, to remove 25% of the kinetic energy of towing aircraft 14. The increased altitude of towed launch aircraft 12/booster rocket 10 also raises the potential energy of booster rocket 10, so that the maneuver increases both kinetic energy and potential energy of booster rocket 10, improving the launch condition of booster rocket 10 at the time of ignition enough to increase launch efficiency by 50% in the example.

Figure 8D:
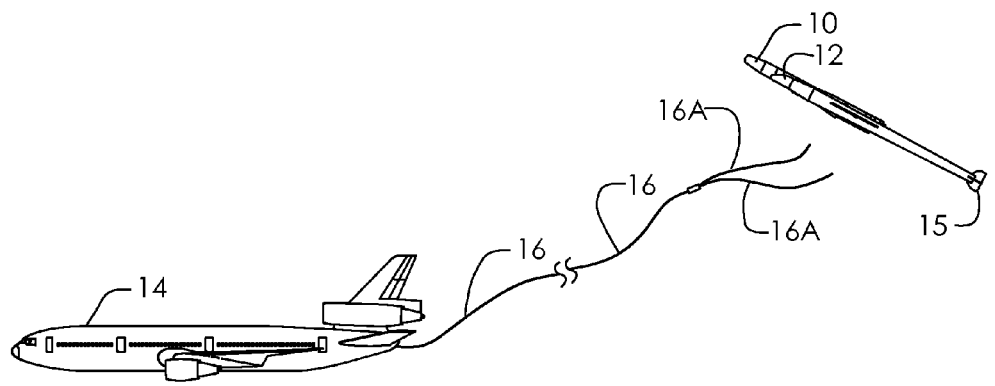
Figure 8E:
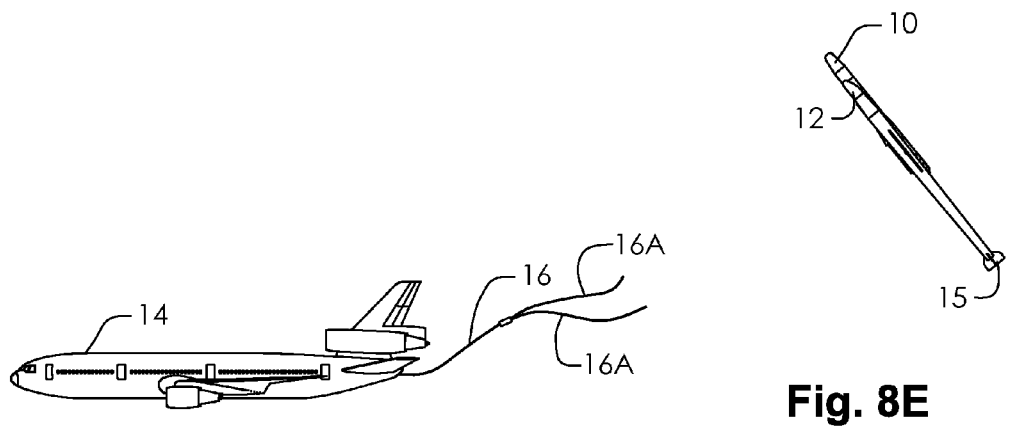
Figure 8F:
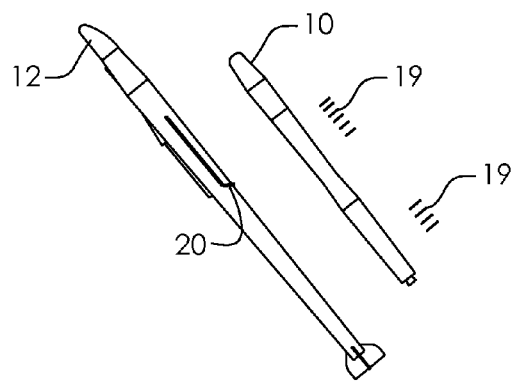
Figure 8G:
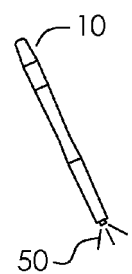
Figure 8G:
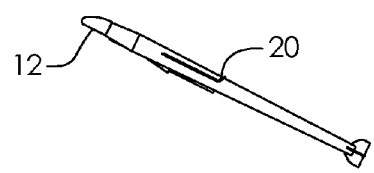
Figure 8H:
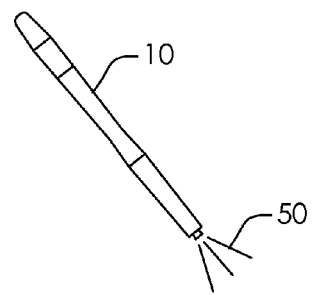
Figure 8H:
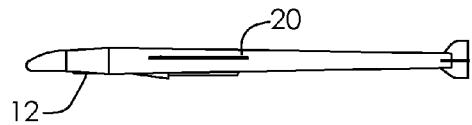

After a predetermined time has elapsed, or a predetermined flight path angle FPA or velocity is reached by towed launch aircraft 12 and booster rocket 10, the first portion of the maneuver is terminated by releasing bridles 16A, as shown in FIG. 8D. Tow line 16 and bridle 16A can either be retrieved by a winch in towing aircraft 14, as shown in FIG. 8E or discarded by releasing tow line 16 at towing aircraft, or carried back to landing. Also, as shown in FIG. 8E, flight path angle FPA of towed launch aircraft 12 continues to increase, as the now un-tethered towed launch aircraft 12 coasts upward. During the coast upward, flight path angle FPA increases, in the example, to an optimum value flight path angle FPA of 50 degrees, further improving the launch condition of booster rocket 10 by increasing the angle of booster rocket 10 with respect to horizontal H and further increasing the potential energy of booster rocket 10 by lifting booster rocket 10 to a higher elevation. After the optimum flight path angle FPA has been reached, as shown in FIG. 8F, straps 19, and any additional latches securing booster rocket 10 to towed launch aircraft 12 are released and flaps 20 are raised to reverse the lift of towed launch aircraft 12, so that towed launch aircraft flies downward away from booster rocket 10. As shown in FIG. 8G, after several seconds, separation between booster rocket 10 and towed launch aircraft 12 has reached a safe distance. Then, booster rocket 10 is ignited to burn a propellant 50 and raise the payload to an orbital distance above the earth. As shown in FIG. 8H, towed launch aircraft 12 recovers to level flight, restores flaps 20 and commences landing operations.

Figure 9:
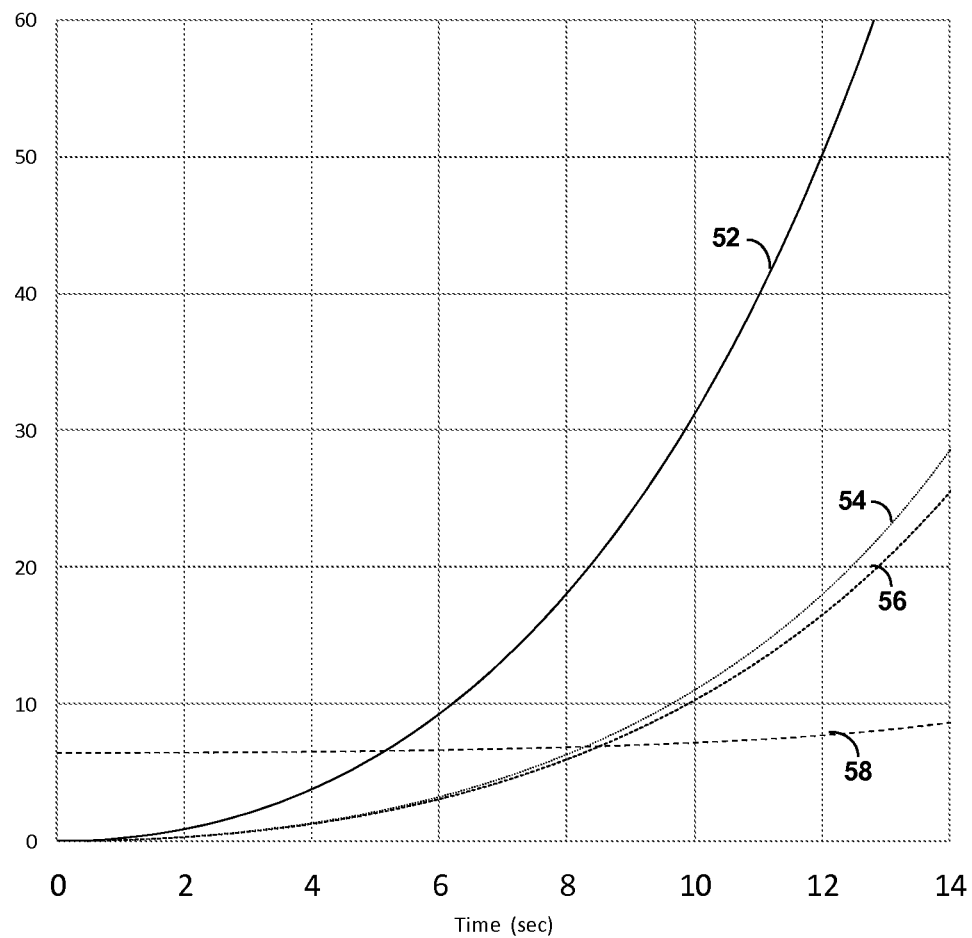
FIG. 9 is a graph depicting the extraction of kinetic energy from towing aircraft 14 during the maneuver depicted in FIGS. 8A-8D.

Referring now to FIG. 9, a graph illustrates the extraction of kinetic energy from towing aircraft 14 during the maneuver depicted in FIGS. 8A-8D. In the example, the entire maneuver lasts 14 seconds. Curve 54 shows an exemplary 28 knot reduction in velocity of towing aircraft 14, and curve 52 represents the exemplary 700 MJ of kinetic energy extracted from towing aircraft 14 during the maneuver, while curve 58 shows the small change in lift coefficient of towing aircraft 14 due to the reduction of speed of towing aircraft 14. Curve 56 shows the exemplary 25% reduction in the kinetic energy of towing aircraft 14.

Figure 10:
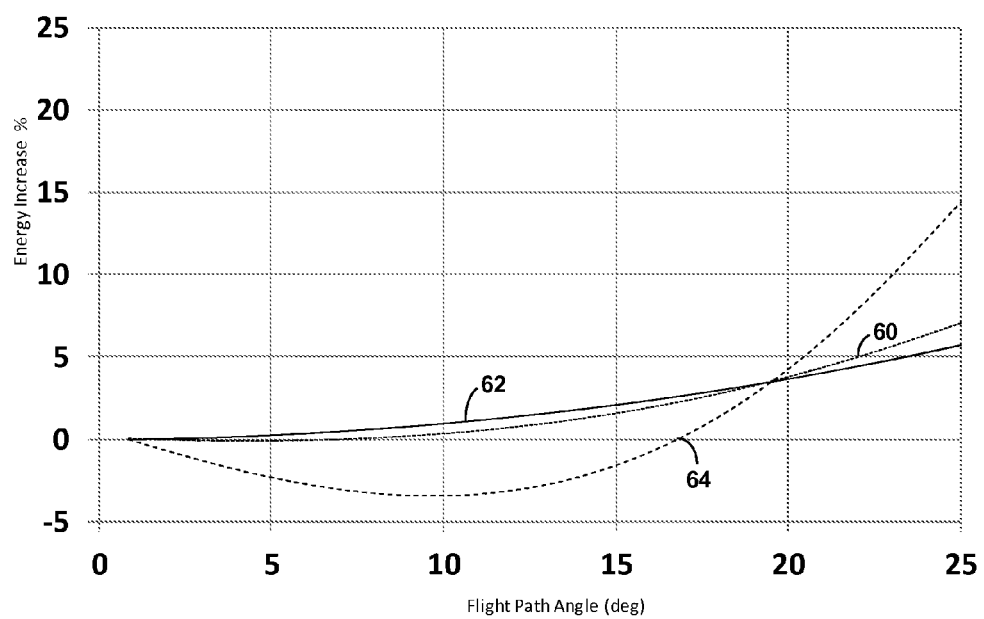
FIG. 10 is a graph depicting the total increase of kinetic energy and potential energy of the combined towed launch aircraft 12 and booster rocket 10 from the maneuver depicted in FIGS. 8A-8D.

Referring now to FIG. 10, a graph illustrates the total energy increase of towed launch aircraft 12 and booster rocket 10 from the maneuver depicted in FIGS. 8B-8D as a function of flight path angle FPA of towed launch aircraft 12 during the maneuver. Curve 60 represents the percentage increase in total energy (kinetic+potential) of towed launch aircraft 12 and booster rocket 10. Curve 62 represents the change in potential energy and curve 64 represents the change in kinetic energy of towed launch aircraft 12 and booster rocket 10 as flight path angle FPA changes during the maneuver. As can be seen from FIG. 10, due to tow line tension TT, flight path angle FPA is increased by 25 degrees while both kinetic and potential energy of towed launch aircraft 12/booster rocket 10 are increased. The combination of the kinetic and potential energy increases, along with the increase in flight path angle FPA provides an increase in launch efficiency booster rocket of 50%.

Figure 11A:
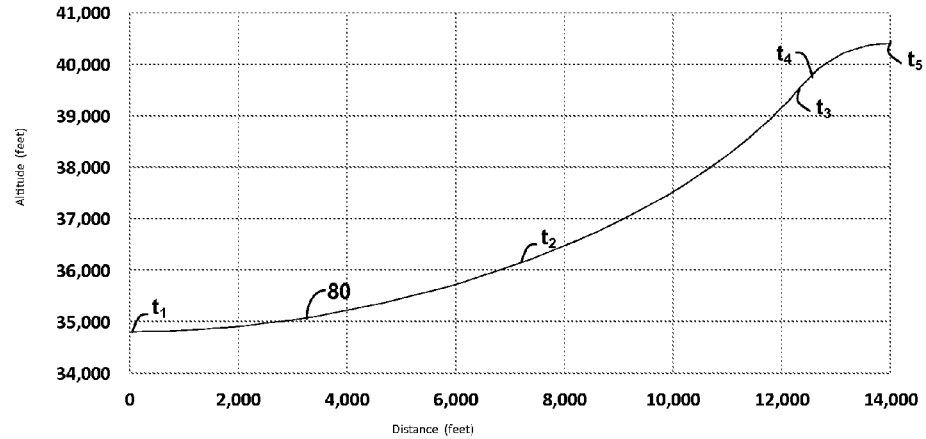
FIG. 11A is a graph depicting an altitude versus distance profile of combined towed launch aircraft 12 and booster rocket 10 during the maneuver depicted in FIGS. 8A-8H.
Figure 11B:
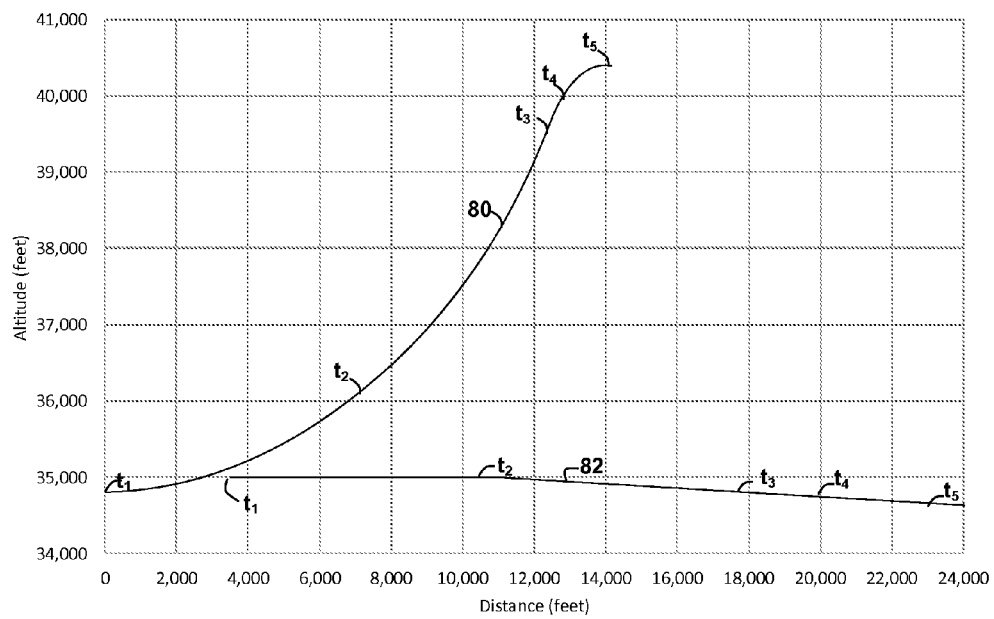
FIG. 11B is a graph depicting an altitude versus distance profile of towing aircraft 14 and towed launch aircraft 12/booster rocket 10 during the maneuver depicted in FIGS. 8A-8H.

Referring now to FIG. 11A, an altitude versus distance profile 80 of combined towed launch aircraft 12 and booster rocket 10 during the maneuver depicted in FIGS. 8A-8H is shown. FIG. 11B additionally shows an altitude vs. distance profile 82 for towing aircraft 14. At time $t_1$, a predetermined altitude of just below 35,000 feet is reached, and the maneuver is commenced by raising elevators 15 to start the dynamic tow maneuver, as described above with reference to FIG. 8A. The difference between the x-coordinate positions of time marker $t_1$ for profile 80 vs. profile 82 is due to the horizontal displacement of towing aircraft 14 and towed launch aircraft 12, i.e., the 3500 foot length of exemplary tow line 16. At time $t_2$, as described above with reference to FIG. 8C, towed launch aircraft 12 and booster rocket 10 have gained 1200 feet in elevation, but more importantly, have increased in velocity by approximately 12% while changing flight path angle FPA to 25 degrees above horizontal. At time $t_2$, towed launch aircraft 12 and booster rocket 10 are decoupled from towing aircraft 14 by releasing tow line 16, as described above with reference to FIG. 8D and continue to coast upward until time $t_3$, as described above with reference to FIG. 8E. At time $t_3$, booster rocket 10 is separated from towed launch aircraft 12, as described above with reference to FIG. 8F. Several seconds later, at time $t_4$, as described above with reference to FIG. 8G, booster rocket 10 ignites, accelerating booster rocket 10 toward orbit. At time $t_5$, as described above with reference to FIG. 8H, towed launch aircraft 12 has decreased flight path angle FPA to zero and is now in level flight in preparation for return flight to landing.

Figure 12:
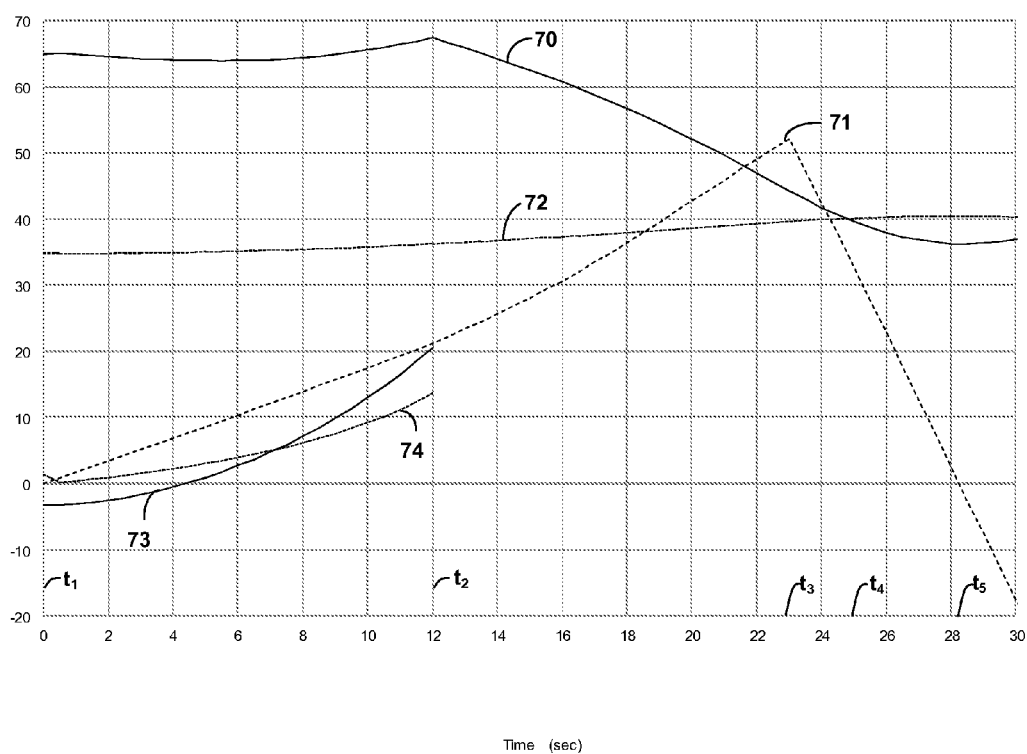
FIG. 12 is a graph depicting various parameters in the transfer of energy between towing aircraft and combined towed launch aircraft 12 and booster rocket 10 during the maneuver depicted in FIGS. 8A-8H.

Referring now to FIG. 12, a graph illustrates various changes occurring in the components of the system during the maneuver illustrated in FIGS. 8A-8H. Curve 70 shows the mach number as a percentage of mach 1 for towed launch aircraft 12/booster rocket 10, which is seen increasing during the dynamic tow maneuver until time $t_2$, which is at the end of the towed pull-up portion of the maneuver when tow line 16 is released. Curve 71 shows flight path angle FPA of towed launch aircraft 12. At time $t_3$, when towed launch aircraft 12 has achieved an optimum flight path angle FPA of 50 degrees, towed launch aircraft 12 separates from booster rocket 10 and decreases flight path angle FPA to distance itself from booster rocket 10, as shown by the rapid decrease in flight path angle FPA. Curve 72 shows the altitude of towed launch aircraft 12 in thousands of feet. Curve 73 shows tow line angle T in degrees and curve 74 shows tow line tension TT in units of ten thousand pounds (i.e., at cable release time $t_2$, towline tension TT=130,000 lb).

Figure 13A:
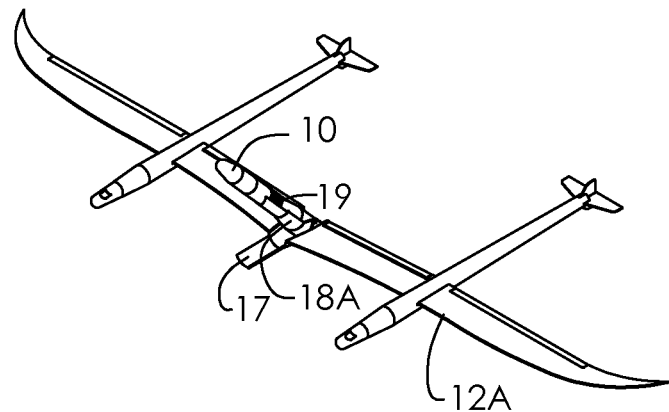
FIG. 13A and FIG. 13B are isometric views of an example of a towed launch aircraft 12A including a tilting cradle 18A.
Figure 13B:
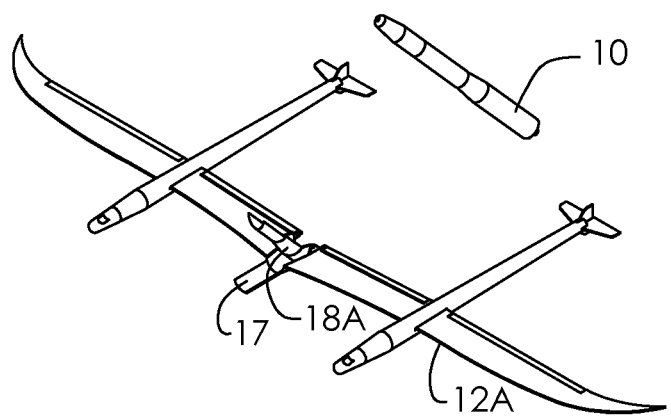
Figure 14:
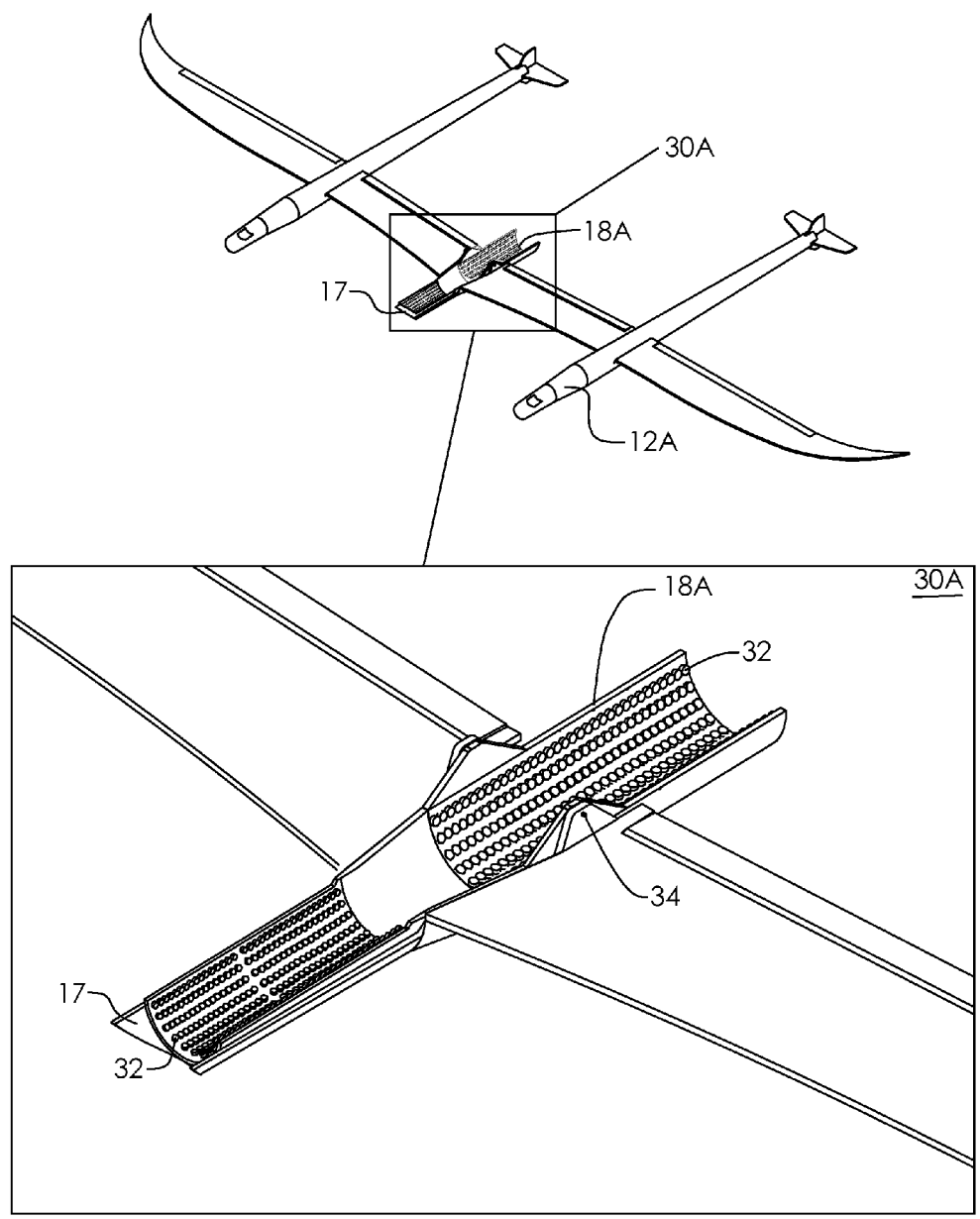
FIG. 14 is an isometric view of towed launch aircraft 12A of FIGS. 13A-13B showing details of tilting cradle 18A.

Referring now to FIGS. 13A-13B, an alternative towed launch aircraft 12A is shown, which is capable of performing a modified maneuver. Both towed launch aircraft 12A and the modified maneuver, which is illustrated below in FIGS. 15A-15H, are similar to towed launch aircraft 12 and the maneuver illustrated in FIGS. 8A-8H described above, so only differences between them will be described below. Towed launch aircraft 12A has a tilting cradle 18A that increases the angle of booster rocket 10 with respect to horizontal H, which is an alternative to increasing the flight path angle FPA of towed launch aircraft 12 to the desired 50 degree launch angle. Cradle 18A rests in a central fuselage 17 of towed launch aircraft 12A until rotated, generally by a hydraulic lifter that contracts to pull the back edge of cradle 18A toward the wing of towed launch aircraft. In the example, cradle 18A is rotated 25 degrees above central longitudinal axis 40 (FIGS. 4A-4B) of towed launch aircraft 12, which results in a total pitch angle of over 50 degrees for booster rocket 10 at launch, when flight path angle FPA of towed launch aircraft 12 reaches 25 degrees. Pitch angle Φ of towed launch aircraft 12 will be approximately 32 degrees at this time, thus the total pitch angle for booster rocket 10 at launch will be approximately 57 degrees in the example. FIG. 14 shows details of cradle 18A, which rotates with respect to fuselage 17 via a hinge 34 that extends from the wing of towed launch aircraft 12 and cradle 18A. Callout 30A shows a further detailed view.

Figure 15A:
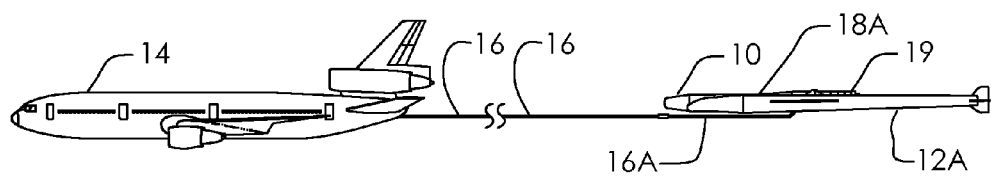
FIGS. 15A-15H are side views of a system including towed launch aircraft 12A of FIGS. 13A-13B in sequential stages of launch of booster rocket 10 with a tilting cradle 18A.
Figure 15B:
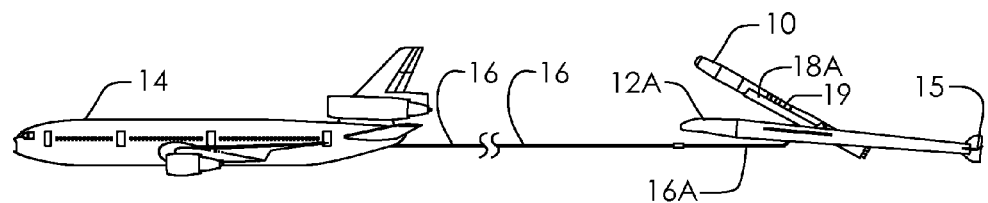
Figure 15C:
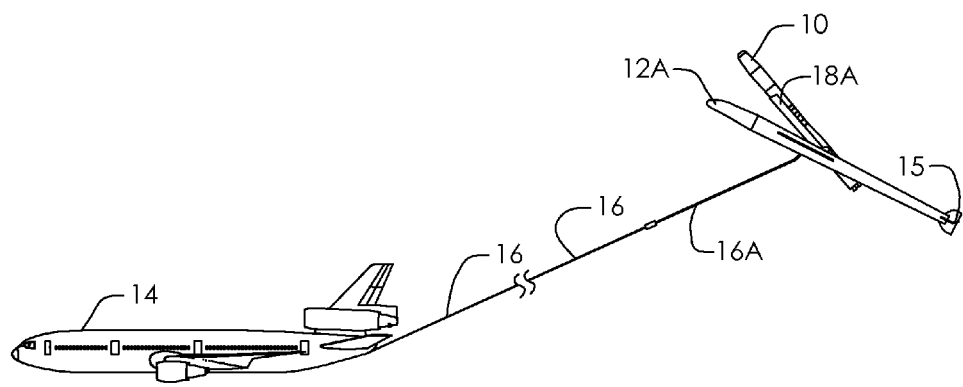
Figure 15D:
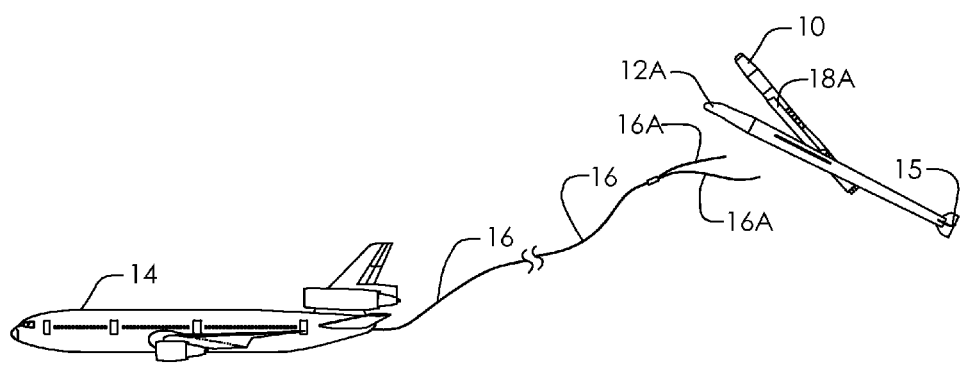

Referring now to FIGS. 15A-15H, an alternative dynamic tow maneuver is shown. In FIG. 15A the system formed by towing aircraft 14, towline 16, bridle sections 16A and towed launch aircraft 12/booster rocket 10 has reached a predetermined altitude, e.g., 30,000-40,000 feet. Towed launch aircraft first rotates cradle 18A to orient booster rocket 10 twenty five degrees above pitch angle Φ. Then the dynamic tow maneuver is commenced as shown in FIG. 15B, by increasing pitch angle Φ of towed launch aircraft 12, by raising elevators 15. As in the maneuver illustrated above, towed launch aircraft 12 and booster rocket 10 rise and are accelerated forward by the tension on tow line 16, until towed launch aircraft reaches a flight path angle FPA of twenty-five degrees above horizontal H as shown in FIG. 15C and in FIG. 15D and bridle 16A is released.

Figure 15E:
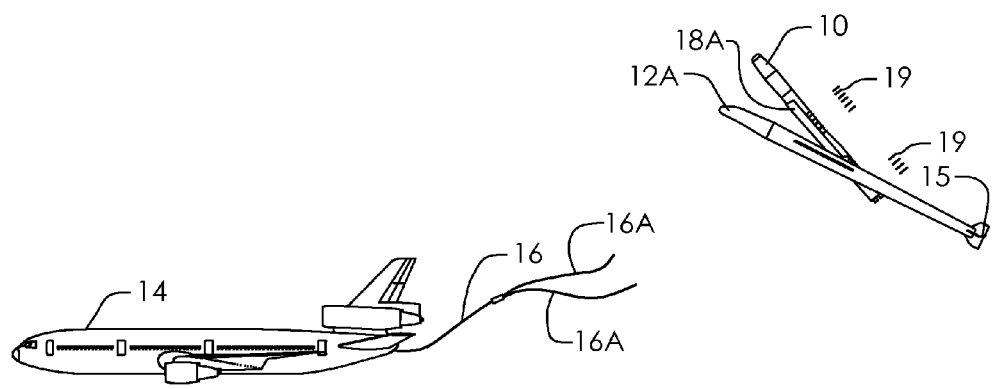
Figure 15F:
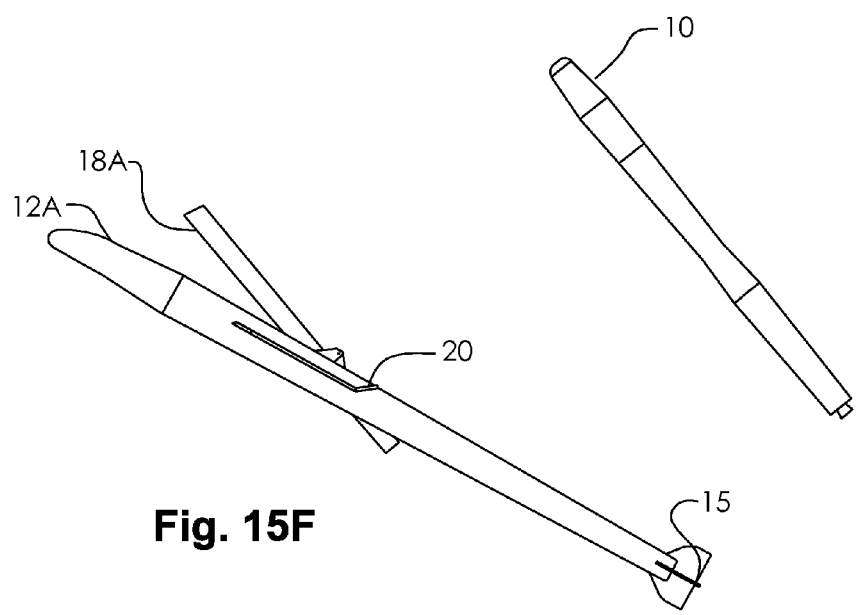
Figure 15G:
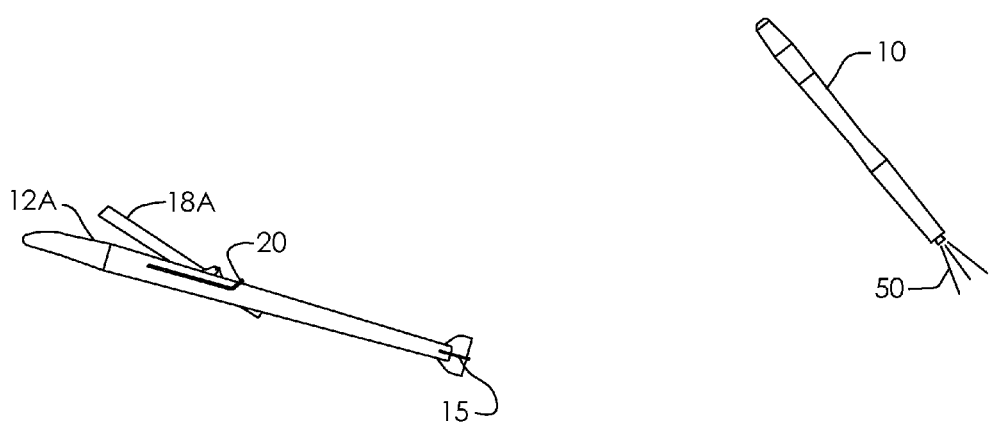
Figure 15H:
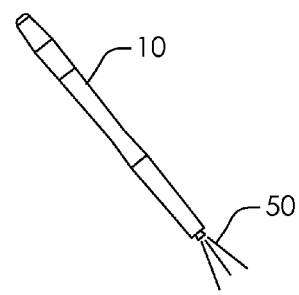
Figure 15H:
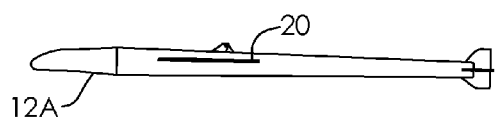

Shortly after, or simultaneously with the release of bridle 16A, as shown in FIG. 15E straps 19, and any additional latches securing booster rocket 10 to cradle 18A are released and flaps 20 of towed launch aircraft 12 are raised and elevators 15 are lowered to cause towed launch aircraft 12 to fly away from booster rocket 10 as shown in FIG. 15F. Once towed launch aircraft 12 has reached a safe distance from booster rocket 10, booster rocket 10 is ignited, to burn propellant 50 and raise the payload to an orbital distance above the earth, as shown in FIG. 15G. Cradle 18A is then retracted and towed launch aircraft 12 is flown to level flight, while booster rocket 10 continues on to achieve orbit, as shown in FIG. 15H.

When using tilting cradle 18A so that booster rocket 10 is launched at a flight path angle FPA of only 25 degrees, it is possible to conduct the full dynamic tow maneuver while tow line 16 is still connected between towed launch aircraft 12A and towing aircraft 14. While such a configuration has the advantage of being able to tow the towed launch aircraft 12A back to landing after launch of booster rocket 10, such a configuration has a disadvantage of providing a smaller separation (safe distance) between towing aircraft 14 and booster rocket 10 during rocket ignition.

While the invention has been particularly shown and described with reference to the preferred embodiment thereof, it will be understood by those skilled in the art that the foregoing and other changes in form, and details may be made therein without departing from the spirit and scope of the invention.

What is claimed is:

1. A method of launching a payload into orbit above a body, the method comprising:
    mounting a booster rocket connected to the payload to a towed launch aircraft;
    towing the towed launch aircraft with a towing aircraft via a tow line to a predetermined elevation;
    executing a first maneuver that increases a lift of the towed launch aircraft to increase a flight path angle of the towed launch aircraft to approximately 25 degrees above horizontal, wherein a tension on the tow line increases substantially, resulting in an acceleration of the towed launch aircraft along a flight path of the towed launch aircraft that increases a kinetic energy of the towed launch aircraft and a deceleration of the towing aircraft that decreases the kinetic energy of the towing aircraft, and wherein the increase in lift of the towed launch aircraft causes an increase in potential energy of the towed launch aircraft, whereby both a kinetic energy and a potential energy of the booster rocket are increased to improve a launch condition of the booster rocket;
    decoupling the booster rocket and the payload from the towed launch aircraft to end the first maneuver; and
    igniting the booster rocket to deliver the payload to an orbital distance from the body.

2. The method of claim 1, further comprising continuing to increase the flight path angle of the towed launch aircraft after the decoupling to further increase a flight path angle of the booster rocket and the potential energy of the booster rocket after completing the decoupling.

3. The method of claim 2, wherein the executing a first maneuver increases the flight path angle to approximately 25 degrees above horizontal, and wherein the continuing to increase the flight path angle of the towed launch aircraft further increases the fight path angle after the decoupling to approximately 50 degrees above horizontal.

4. The method of claim 1, wherein the executing a first maneuver comprises raising elevators at a tail of the towed launch aircraft.

5. The method of claim 1, wherein the booster rocket and payload are secured with straps, and wherein the decoupling is commenced by releasing the straps.

6. The method of claim 1, wherein the decoupling comprises the towed launch aircraft executing a second maneuver that decreases the flight path angle of the towed launch aircraft after completion of the decoupling to increase separation of the towed launch aircraft and the booster rocket at the end of the first maneuver.

7. The method of claim 6, wherein the second maneuver is performed by raising flaps along a wing of the towed launch aircraft to reverse the lift of the towed launch aircraft.

8. The method of claim 1, wherein the towed launch aircraft is a glider, and wherein the method further comprises returning the towed launch aircraft to a landing on the body without power.

9. The method of claim 1, wherein the towed launch aircraft is a powered aircraft, and wherein the method further comprises returning the towed launch aircraft to a landing on the body under power.

10. The method of claim 1, wherein the mounting mounts the booster rocket in a cradle provided atop the towed launch aircraft.

11. The method of claim 10, wherein the cradle is located above a wing of the towed launch aircraft and is rotatable with respect to a fuselage of the towed launch aircraft, and wherein the method further comprises rotating the cradle to tilt the booster rocket upward during at least a portion of the executing of the first maneuver.

12. A system for launching a payload into orbit above a body, comprising:
   a booster rocket connected to the payload;
   a towed launch aircraft for carrying the booster rocket, wherein the booster rocket and payload are detachably secured to the towed launch aircraft; and
   a towing aircraft for towing the towed launch aircraft and coupled to the towed launch aircraft by a tow line, wherein the towed launch aircraft executes a first maneuver that increases a lift of the towed launch aircraft to increase a flight path angle of the towed launch aircraft to an angle of approximately 25 degrees above horizontal, wherein a tension on the tow line increases substantially, resulting in an acceleration of the towed launch aircraft along a flight path of the towed launch aircraft that increases a kinetic energy of the towed launch aircraft and a deceleration of the towing aircraft that decreases the kinetic energy of the towing aircraft until the tow line is released and the booster rocket and the payload are decoupled from the towed launch aircraft, whereby the booster rocket can be ignited to deliver the payload to an orbital distance from the body, and wherein the increase in lift of the towed launch aircraft causes an increase in potential energy of the towed launch aircraft, whereby both a kinetic energy and a potential energy of the booster rocket are increased to improve a launch condition of the booster rocket.

13. The system of claim 12, wherein the towed launch aircraft continues to increase the flight path angle of the towed launch aircraft after the decoupling of the tow line to further increase a flight path angle of the booster rocket and the potential energy of the booster rocket after completing the decoupling of the tow line.

14. The system of claim 13, wherein the execution of the first maneuver increases the flight path angle to an angle of approximately 25 degrees above horizontal, and wherein the towed launch aircraft continues to increase the flight path angle to approximately 50 degrees above horizontal after the decoupling.

15. The system of claim 12, wherein the towed launch aircraft executes the first maneuver by raising elevators at a tail of the towed launch aircraft.

16. The system of claim 12, wherein the booster rocket and payload are detachably secured with straps and wherein the decoupling of the booster rocket and payload from the towed launch aircraft is commenced by releasing the straps.

17. The system of claim 12, wherein the towed launch aircraft executes a second maneuver that decreases a flight path angle of the towed launch aircraft to increase separation of the towed launch aircraft and the booster rocket at the end of the first maneuver.

18. The system of claim 17, wherein the second maneuver is performed by raising flaps along a wing of the towed launch aircraft to reverse the lift of the towed launch aircraft.

19. The system of claim 12, wherein the towed launch aircraft is a glider, whereby the towed launch aircraft can be returned to a landing on the body without power.

20. The system of claim 12, wherein the towed launch aircraft is a powered aircraft, whereby the towed launch aircraft can be returned to a landing on the body under power.

21. The system of claim 12, wherein the towed launch aircraft comprises a cradle for mounting the booster rocket, and wherein the booster rocket is mounted in the cradle.

22. The system of claim 21, wherein the cradle is located above a wing of the towed launch aircraft and is rotatable with respect to a fuselage of the towed launch aircraft, and wherein the cradle is rotated to tilt the booster rocket upward during at least a portion of the first maneuver.

23. A method of launching a payload into orbit above a body, the method comprising:
   securing a booster rocket connected to the payload in a cradle of a towed launch aircraft with a plurality of straps, wherein the cradle is located above a wing of the towed launch aircraft;
   towing the towed launch aircraft with a towing aircraft via a tow line to a predetermined elevation;
   executing a first maneuver by raising elevators at a tail of the towed launch aircraft to increase a lift of the towed launch aircraft to increase a flight path angle of the towed launch aircraft to approximately 25 degrees above horizontal, wherein a tension on the tow line increases substantially, resulting in an acceleration of the towed launch aircraft along a flight path of the towed launch aircraft that increases a kinetic energy of the towed launch aircraft and a deceleration of the towing aircraft that decreases the kinetic energy of the towing aircraft, and wherein the increase in lift of the towed launch aircraft causes an increase in potential energy of the towed launch aircraft, whereby both a kinetic energy and a potential energy of the booster rocket are increased to improve a launch condition of the booster rocket;
   disconnecting the tow line, releasing the straps and executing a second maneuver by raising flaps of a wing of the towed launch aircraft to reverse the lift of the towed launch aircraft to decrease a flight path angle of the towed launch aircraft to separate the towed launch aircraft and the booster rocket and end the first maneuver; and
   igniting the booster rocket to deliver the payload to an orbital distance from the body.

24. The method of claim 23, wherein the cradle is rotatable with respect to a fuselage of the towed launch aircraft, and wherein the method further comprises rotating the cradle to tilt the booster rocket upward during at least a portion of the first maneuver to increase a lengthwise orientation of the booster rocket to an angle of approximately 50 degrees above horizontal.

\* \* \* \* \*